_US006056897A_

United States Patent [19]
Pallini et al.

[11] Patent Number: 6,056,897
[45] Date of Patent: May 2, 2000

[54] STABILIZER IN SOLID FORM FOR ORGANIC POLYMERS

[75] Inventors: Luciano Pallini, Milan; Silvestro Costanzi, Lodi; Carlo Neri, Milan; Francesco Groppelli, Lodi, all of Italy

[73] Assignee: Great Lakes Chemical (Europe) GmbH, Fraunfeld, Switzerland

[21] Appl. No.: 09/025,244

[22] Filed: Feb. 18, 1998

[30] Foreign Application Priority Data

Feb. 17, 1997 [IT] Italy .................................. MI97A0359

[51] Int. Cl.[7] .............................. C09K 15/04; C08J 5/34; C08J 3/00; C08J 3/28; C08J 5/01
[52] U.S. Cl. .......................... 252/399; 524/110; 524/448; 524/430; 524/492
[58] Field of Search ............................. 252/399; 524/110, 524/448, 430, 492

[56] References Cited

U.S. PATENT DOCUMENTS

| | | | |
|---|---|---|---|
| 5,308,549 | 5/1994 | Laermer et al. | 252/399 |
| 5,574,082 | 11/1996 | Keller et al. | 524/110 |
| 5,594,055 | 1/1997 | Young | 524/291 |
| 5,844,027 | 12/1998 | Burdick et al. | 524/110 |

FOREIGN PATENT DOCUMENTS

| | | |
|---|---|---|
| 0 613 923 | 9/1994 | European Pat. Off. . |
| 0 619 271 | 10/1994 | European Pat. Off. . |
| 0 621 307 | 10/1994 | European Pat. Off. . |
| 0 542 108 | 9/1997 | European Pat. Off. . |
| 0 805 178 | 11/1997 | European Pat. Off. . |

*Primary Examiner*—Gabrielle Brouillette
*Assistant Examiner*—Monique Cole
*Attorney, Agent, or Firm*—Olbon, Spivak, McClelland, Maier & Neustadt, P.C.

[57] ABSTRACT

Solid form of a stabilizer for organic polymers consisting of one or more tocopherols, as such or in formulation, absorbed on porous polypropylene with a high crystallinity, in a quantity ranging from 30% to 85% by weight. The above tocopherols, as such or in formulation, can also be used in a mixture with other stabilizers such as, for example, secondary antioxidants containing phosphorous or sulfur, sterically hindered phenols and sterically hindered amines.

15 Claims, No Drawings

STABILIZER IN SOLID FORM FOR ORGANIC POLYMERS

The present invention relates to a solid form of a stabilizer for organic polymers.

More specifically, the present invention relates to a solid form of a stabilizer for organic polymers consisting of one or more tocopherols, as such or in formulation, absorbed on porous polypropylene with a high crystallinity, a process for its preparation, as well as its use in the stabilization of organic polymers.

The present invention also relates to a solid form of stabilizing mixtures for organic polymers absorbed on porous polypropylene with a high crystallinity, comprising one or more tocopherols, as such or in formulation, and other stabilizers such as, for example, secondary antioxidants containing phosphorous or sulfur, sterically hindered phenols and sterically hindered amines.

The term tocopherol refers to compounds having the basic structure of Vitamine E, a substance used as antioxidant capable of improving the stability to oxidation, light and heat, of organic polymers, among which plastic materials, to which it is added.

The basic structure of Vitamine E is represented by the following general formula (I):

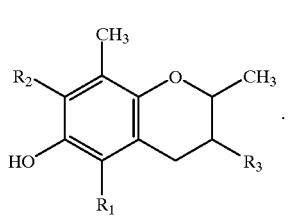

In the products which form natural Vitamine E, $R_1$, $R_2$ and $R_3$ have the following meanings:

$R_1$ and $R_2$, each independently, represent a hydrogen atom or a methyl group;

$R_3$ represents one of the following groups having formula (II) or (III):

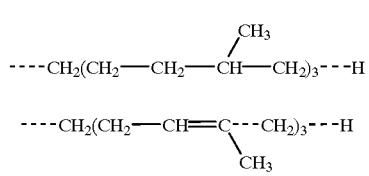

The Vitamine E commercially available however, is a viscous liquid at room temperature and, for this reason, its use as stabilizer for organic polymers creates difficulties in the feeding phase and in handling.

In fact, stabilizers for organic polymers are generally added to the organic polymer to be stabilized in the form of powders or granules, or mixtures of stabilizers in solid form are added, using feeding systems which are specific for products in solid form.

International patent application WO 96/22325, describes the possibility of obtaining microcapsules containing a stabilizing mixture comprising one or more derivatives of chromane, among which Vitamine E, and an inert organic solvent. The microcapsules consist of resins based on formaldehyde mixed with phenol, urea or melamine. In this way, however, foreign substances are introduced inside the polymer to be stabilized.

The Applicant has now found that it is possible to obtain, by absorption on a particular porous polypropylene with a high crystallinity, a solid form of Vitamine E (tocopherol) as such, or in suitable formulations, or mixed with other stabilizers, which allows a better use as stabilizer for organic polymers. This solid form facilitates the handling and feeding of the additive itself, overcoming problems due to the use of viscous liquids and also avoids the introduction of undesired foreign substances in the polymer to be stabilized.

In addition, a further advantage of the above solid form is the high concentration which the stabilizer can reach. In fact, Vitamine E, as such or in suitable formulations, or mixed with other stabilizers, can reach, in the above solid form, 85% by weight whereas in the known solid forms such as microcapsules or "master-batches", it is generally not possible to reach concentrations of more than 50%.

The present invention therefore relates to a solid form of a stabilizer for organic polymers consisting of one or more tocopherols, as such or in formulation, absorbed on porous polypropylene with a high crystallinity, in a quantity ranging from 30% to 85% by weight.

The stabilizer is preferably absorbed on porous polypropylene with a high crystallinity in a quantity ranging from 50% to 85% by weight.

The term tocopherols refers to compounds having the structure of general formula (I) indicated above.

Any type of tocopherol can be used for the purposes of the present invention. Examples of tocopherols which can be used but which are not limiting, are D,L-α-tocopherol (synthetic Vitamine E) and compounds forming natural Vitamine E.

The four tocopherol constituents of natural Vitamine E are methyl derivatives of [2-methyl- 2-(4',8',12'-trimethyltridecyl)-6-chromanol]tocol and comprise D-α-tocopherol (5,7,8-trimethyltocol), D-β-tocopherol (5,8-dimethyltocol), D-γ-tocopherol (7,8-dimethyltocol) and D-δ-tocopherol (8-methyltocol).

Non-limiting derivatives of the above compounds which can equally be used for the purposes of the present invention are D-α-tocopherol acetate, DL-α-tocopherol acetate, D-α-tocopherol succinate acid, D-α-tocopherol polyethyleneglycol 1000 succinate, D-α-tocopherol quinone and their mixtures.

Compounds analogous to the four tocopherols listed above can-also be used, such as methyl derivatives of [2-methyl-2-(4',8',12'-trimethyltrideca-3',7',11'-trienyl)-6-chromanol]toco-trienol containing three unsaturated bonds in the lateral chain.

Preferred tocopherols for the purposes of the present invention are α-tocopherol and γ-tocopherol, even more preferred is α-tocopherol.

Formulations of tocopherols which can be used for the purposes of the present invention are those comprising:

(a) from about 10% to about 50% by weight of at least one tocopherol;

(b) up to 50% by weight of polyethyleneglycol and/or (c) up to 50% by weight of glycerol monocaprylactocaprate and, optionally, (d) up to 20% by weight of glycerine, the total weight percentage of the two, three or four components being 100.

The above formulations are described, for example, in European patent application EP 542.108.

For the purposes of the present invention a porous polypropylene with a high crystallinity is used, obtained as described in European patent application 619.271.

The above polypropylene has all the characteristics which make it suitable for the purposes of the present invention:

it has a high absorbing efficiency expressed as quantity of additives absorbed per weight unit of absorbing material;

it has micropores which prevent sweating by capillarity;

it has a high surface development of the material which improves its absorbing efficiency;

after absorption of the stabilizers, it allows a non-sticky product to be obtained, with a good consistency, thus favouring its subsequent use as stabilizer.

The porous polypropylene with a high crystallinity used for the present invention is obtained with a process described in European patent application 619.271 cited above. This process comprises:

(1) mixing a polypropylene with at least one silicon compound carrying a sterically hindered amine group in the molecule;

(2) melting the above mixture at a temperature and for a time sufficient to form a liquid phase;

(3) slowly cooling the mixture until a solid is formed which is then reduced to the desired physical form;

(4) extracting the silicon compound from the above solid with a solvent.

Polyprbpylenes which can be used for the purposes of the above process are all those obtained by polymerization in the presence of Ziegler-Natta catalysts such as, for example, the products of Himont sold under the name of MOPLEN.

Silicon compounds carrying a sterically hindered amine group in the molecule, which can be used in step (1) of the above process are those known under the trade-name of UVASIL of Great Lakes already described in European patent application 619.271.

Preferred silicon compounds in step (1) of the above process are compounds having general formula (IV) or (V):

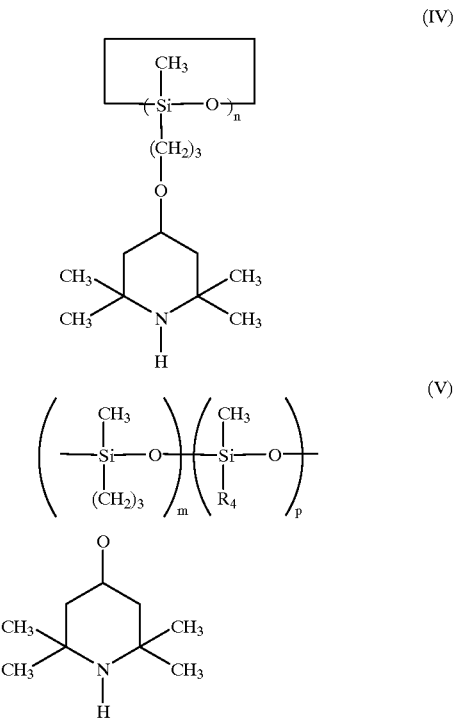

wherein:

n is an integer between 3 and 6, extremes included;

$R_4$ represents a $C_1$–$C_{18}$ linear or branched alkyl group; preferably a linear or branched alkyl group with eight carbon atoms;

m+p have a value between 3 and 60, extremes included and $1 \leq m/p \leq 4$.

Even more preferred for the purposes of the present invention is the silicon compound corresponding to tetramethyl-tetrapropyl-3-oxy-[4-(2,2,6,6-tetramethyl) piperidinyl]cyclotetrasiloxane known under the trade-name of UVASIL 299 LM of Great Lakes.

In step (4) of the process described above, the solid obtained in step (3) is subjected to extraction using an extractor of the Soxhlet type or a column equipped with a porous septum and heating jacket, in the presence of suitable solvents such as, for example, toluene, hexane, heptane, chloroform, ethanol, methanol, acetone, etc.

Step (4) is carried out at a temperature ranging from 40° C. to the boiling point of the solvent provided it is not higher than 85° C. The residual porous polypropylene from the extraction is dried under vacuum by bringing it to a temperature ranging from 40° C. to 100° C.

The polypropylene obtained as described above observed at 2500 magnification (2500×) has a spongy surface with intercommunicating pores having dimensions of 3 μm to 20 μm in diameter. The dimensions and homogeneity of the pores mainly depend on the quantity of silicon compounds carrying a sterically hindered amine group in the molecule, used in step (1) of the above process.

It has in fact been observed that porous products obtained starting from a mixture of polypropylene/silicon compounds with a weight ratio of 1/9 respectively, consist of heterogeneous pores having greater dimensions with respect to those obtained starting, for example, from a mixture of polypropylene/silicon compounds with a weight ratio of 1/2.3 respectively (Example 1 below).

Considerable differences among products with different porosities can also be observed at 300 magnifications (300×). In fact, at this enlargement, the porous products obtained starting, for example, from a mixture of polypropylene/silicon compounds with a weight ratio of 1/2.3 respectively, consist, at the cleavage surface, of numerous spherulites whose composition planes create a structure similar to that observed for crystalline products, unlike that observed in the case of porous products obtained starting from a mixture of polypropylene/silicon compounds with a weight ratio of 1/9 respectively.

Calorimetric measurements (DSC) show that the porous polypropylene obtained starting from a mixture of polypropylene/silicon compounds with a weight ratio of 1/2.3 respectively, has a crystallinity varying from 65% to 75%, whereas the porous polypropylene obtained starting from a mixture of polypropylene/silicon compounds with a weight ratio of 1/9 respectively, has a crystallinity varying from 25% and 35%. The crystallinity is calculated on the melting ΔH of the polypropylene.

A further distinction between the products having different degrees of crystallinity is the mechanical consistency; the porous polypropylene obtained from a mixture of polypropylene/silicon compounds with a weight ratio of 1/9 respectively, consisting of heterogeneous pores and higher dimensions, has a density equal to 0.09 g/cc and is much more fragile and consequently more subject to crumbling than that obtained starting from a mixture of polypropylene/silicon compounds with a weight ratio of 1/2.3 respectively which has a higher crystallinity and more homogeneous pores with lower dimensions.

The porous polypropylene with a high crystallinity used for the purposes of the present invention has a high absorbing efficiency and consequently allows low weight ratios between porous polypropylene and stabilizers to be absorbed, to be used, these ratios being between 0.9 and 0.15, preferably between 0.7 and 0.35.

The high crystallinity associated with the small dimension of the pores and their very regular distribution (homogeneous pores), makes it unnecessary to use other substances, foreign to the stabilizer or formulation of the stabilizer used, to prevent the releasing of the products absorbed by the polypropylene carrier.

In addition, the high crystallinity of the polypropylene used for the purposes of the present invention enables solid forms to be obtained which are not sticky, even in the presence of high concentrations (higher than 50%) of stabilizer, alone or in formulation or mixed with other stabilizers.

The porous polypropylene with a high crystallinity used in the present invention does not release the absorbed stabilizers even -when subjected to light pressure and does not undergo sweating even after months of storage at room temperature. This polypropylene is generally used in the form of powder with particles having a diameter ranging from 0.1 mm to 2.5 mm. The porous polypropylene can be used in other forms such as flakes, drops or microspheres.

For the purposes of the present invention however, it is preferable to use a porous polypropylene in the form of powder with particles having a diameter ranging from 0.5 mm to 1.5 mm.

Also for the purposes of the present invention, the tocopherol or tocopherols, as such or in formulation, can also be used in a mixture with other stabilizers such as, for example, secondary antioxidants containing phosphorous or sulfur, sterically hindered phenols and sterically hindered amines.

A further object of the present invention therefore relates to a solid form of stabilizing mixtures for organic polymers comprising:

(a') from 30% to 85% by weight of one or more tocopherols as such or in formulation;

(b') from 0% to 50% by weight of a secondary antioxidant containing phosphorous or sulfur;

(c') from 0% to 50% by weight of a sterically hindered phenol;

(d') from 0% to 50% by weight of a sterically hindered amine;

these mixtures being absorbed on porous polypropylene with a high crystallinity in a quantity ranging from 30% to 85% by weight.

These stabilizing mixtures are preferably absorbed on porous polypropylene with a high crystallinity in a quantity ranging from 50% to 85% by weight.

Examples of secondary antioxidants (b') which can be used for the present invention are triesters of phosphorous acid (phosphites), diesters of phosphorous acid (phosphonites) and esters of dithiodipropionic acid.

Preferred secondary antioxidants (b') containing phosphorous are:

bis(2,4-di-t-butyl)pentaerythritol diphosphite, known under the trade-name of Ultranox 626 of General Electric;

distearylpentaerythritol diphosphite, known under the trade-name of Weston 618 of General Electric;

tris(2,4-di-t-butylphenyl)phosphite, known under the trade-name of Alkanox 240 of Great Lakes;

tetrakis(2,4-di-t-butylphenyl)-4,4'-diphosphonite, known under the trade-nane of Irgafos P-EPQ of Ciba Geigy;

3,9-bis[2,4-bis(1-methyl-1-phenylethyl)phenoxy]-2,4,8,10-tetraoxa-3,9-diphosphaspiro[5.5]undecane, known under the trade-name of Doverphos S-9228 of Dover;

2 2',2"-nitrilo[triethyl-tris(3,3',5,5'-tetra-t-butyl-1,1'biphenyl-2,2'diyl)phosphite], known under the trade-name of Irgafos 12 of Ciba Geigy;

5-butyl-5-ethyl-2-[2,4,6-tris(1,1-dimethylethyl)-phenoxy]-1,3,2-dioxaphosphorinane, known under the trade-name of Ultranox 641 of General Electric.

Preferred secondary antioxidants (b') containing sulfur are distearylthiodipropionate (DSTDP) and dilaurylthiodipropionate (DLTDP).

Sterically hindered phenols (c') which can be used for the purpose are:

tetrakismethylene(3,5-di-t-butyl-4-hydroxyhydrocinnamate)methane, known under the trade-name of Anox 20 of Great Lakes;

octadecyl-3-(3',5'-di-t-butyl-4'-hydroxyphenyl)-propionate, known under the trade-name of Anox PP18 of Great Lakes.

Sterically hindered amines (d') which can be used for the purpose are:

poly-methylpropyl-3-oxy-[4-(2,2,6,6-tetramthyl)piperidinyl]siloxane, known under the trade-name of Uvasil 299 of Great Lakes;

bis(2,2,6,6-tetramethyl-4-piperidinyl)sebacate, known under the trade-name of Lowilite 77 of Great Lakes;

bis(1,2,2,6,6-pentamethyl-4-piperidinyl)sebacate, known under the trade-name of Lowilite 76 of Great Lakes;

bis(2,2,6,6-tetramethyl-piperidyl)succinate;

bis(1,2,2,6,6-pentamethyl-4-piperidyl)butyl-(3',5'-di-t-butyl-4-hydroxybenzyl)malonate, known under the trade-name of Tinuvin 144 of Ciba Geigy;

condensation product between 1-(2-hydroxyethyl)-2,2,6,6-tetrahydroxypiperidine and succinic acid, known under the trade-name of Tinuvin 622;

condensation product between N,N'-bis(2,2,6,6-tetramethyl-4-piperidyl)hexamethylenediamine and 4-t-octylamino-2,6-dichloro-1,3,5-triazine;

tris(2,2,6,6-tetramethyl-4-piperidyl)nitrilotriacetate;

tetrakis(2,2,6,6-tetramethyl-4-piperidyl)-1,2,3,4-butanetetracarboxylate;

1,1'-(1,2-ethanediyl)bis(3,3,5,5-tetramethylpiperazinone;

4-benzoyl-2,2,6,6-tetramethylpiperidine;

4-stearyloxy-2,2,6,6-tetramethylpiperidine;

bis(1,2,2,6,6-pentamethylpiperidyl)-2-n-butyl-2-(2-hydroxy-3,5-di-t-butylbenzyl)malonate;

3-n-octyl-7,7,9,9-tetramethyl-1,3,8-triazaspiro[4.5]decan-2,4-dione;

bis(1-octyloxy-2,2,6,6-tetramethylpiperidyl)succinate;

condensation product between N,N'-bis-(2,2,6,6-tetramethyl-4-piperidyl)hexamethylene-diamine and 4-morpholine-2,6-dichloro-1,3,5-triazine;

condensation product between 2-chloro-4,6-bis(4-n-butylamino-2,2,6,6-tetramethyl-piperidyl)-1,3,5-triazine and 1,2-bis(3-aminopropyl-amino)ethane;

condensation product between 2-chloro-4,6-bis( 4-n-butylamino-1,2,2,6,6-pentamethylpiperidyl)-1,3,5-triazine and 1,2-bis(3-aminopropyl-amino)ethane;

8-acetyl-3-dodecyl-7,7,9,9-tetramethyl-1,3,8-triazaspiro[4.5]decane-2,4-dione;

3-dodecyl-1-(2,2,6,6-tetramethyl-4-piperidyl)-pyrrolidin-2,5-dione;

3-dodecyl-1-(1,2,2,6,6-tetramethyl-4-piperidyl)-pyrrolidin-2,5-dione.

A further object of the present invention relates to a process for the preparation of the above solid form.

The tocopherol, as such or in formulation, or in the presence of other stabilizers, is absorbed on the porous polypropylene by means of a process which comprises:

(i) dissolving one or more tocopherols, as such or in formulation, or in the presence of other stabilizers, in an inert organic solvent at a temperature ranging from 20° C. to 50° C., preferably at room temperature;

(ii) adding porous polypropylene and maintaining the mixture under stirring for 60 minutes, at a temperature ranging from 20° C. to 50° C., preferably at room temperature;

(iii) removing the solvent at a temperature ranging from 50° C. to 100° C. and at a pressure which is gradually reduced to 5 mm/Hg.

Inert organic solvents which can be used for the purpose in step (i) of the above process are aromatic solvents such as, for example, toluene, xylene, etc.; aliphatic solvents such as, for example, isoctane, heptane, cyclohexane, etc.; alcohols such as, for example, ethyl alcohol, methyl alcohol, isopropyl alcohol, etc.

The term organic polymers mainly refers to polyolefins. Examples of polyolefins, which are not limiting, are: (1) polyethylene such as, for example, high density polyethylene (HDPE), low density polyethylene (LDPE) linear low density polyethylene (LLDPE) and polyethylene with a high molecular weight, which contain the polyethylene monomer as repetitive unit inside the copolymer, and mixtures of polyethylene with one or more different polymers; (2) polypropylene such as, for example, homopolymers of polypropylene, copolymers which contain the polypropylene monomer as repetitive unit, and mixtures of polypropylene with one or more different polymers. Experts in the field will recognize and be able to produce the different types of copolymers which can be formed with polyethylene and/or polypropylene which alternatively include block copolymers and grafted copolymers, as well as mixtures of polyethylene and/or polypropylene with other polymers. Other organic polymers which can be stabilized are polyvinyl chlorides and styrene polymers and their copolymers, polyurethanes.

The incorporation of the solid forms of stabilizers described above in the organic polymers, is carried out according to the methods known in the art.

The stabilizer in solid form of the present invention is incorporated in the polymer to be stabilized in a quantity ranging from 0.01% to 0.5% by weight, preferably from 0.02% to 0.2%.

The stabilizing mixtures in solid form which are also an object of the present invention are incorporated in the polymer to be stabilized in a quantity ranging from 0.01% to 0.5% by weight, preferably between 0.02% and 0.2%.

A further object of the present invention relates to the use of the above solid forms in the stabilization of organic polymers.

The following illustrative examples are provided for a better understanding of the present invention and for its embodiment but do not limit the scope of the invention itself.

EXAMPLE 1
Preparation of Porous Polypropylene with a High Crystallinity Containing 70% of Voids.

280 g of liquid siliconic polymer consisting of tetramethyl-tetrapropyl-3-oxy-[4-(2,2,6,6-tetramethyl)-piperidinyl]cyclotetrasiloxane (UVASIL 299 LM of Great Lakes) and 120 g of polypropylene in powder form of the type Moplen FLF20 of Himont having an MFI of 12 g/10' (ASTM D1238L) and a density of 0.9 g/cc, are charged into a reactor equipped with a stirrer.

The mixture is brought to a temperature of 220° C. and is maintained for about 30 minutes at this temperature thus allowing the polypropylene to melt and form a single liquid phase with the siliconic polymer.

The mixture is subsequently discharged from the reactor, poured into an aluminum tank and left to cool to room temperature. The cooling time is 20 minutes.

The solid product thus obtained, waxy and friable in appearance, is ground and sieved with suitable sieves to obtain a powder with a particle size ranging from 0.1 mm to 0.5 mm in diameter.

250 g of the above powder are charged onto a glass extraction column equipped with a porous septum and heating jacket inside which water heated to a temperature of 50° C. circulates.

750 cc of toluene are passed from the top of the column through the powder over a period of about 2 hours, obtaining the complete extraction of the siliconic product from the polypropylene.

The polypropylene powder remaining in the column can be dried by the stripping under vacuum of the toluene at a temperature of 70° C. and at a pressure gradually reduced from 150 mm/Hg to 5 mm/Hg.

After drying, 73 g of polypropylene powder are recovered, equal to 97.5% of the expected amount.

Upon microscopic observation at 2500×, the polypropylene has a spongy surface having intercommunicating pores with dimensions ranging from 3 μm to 6 μm.

The porous polypropylene thus obtained, which proves to be highly crystalline, has the following characteristics:

melting point: 170° C.–172° C. (determined by DSC analysis):

melting ΔH: 115–120 joule/g (determined by DSC analysis);

MFI: 20–22 g/10';

density of the bulk: 0.29 g/cc;

density of the powder having a diameter of 0.1–0.5 mm: 0.14 g/cc;

quantity of voids: 70%±2%.

EXAMPLE 2
Preparation of Porous Polypropylene with a High Crystallinity Containing 85% of Voids.

212 g of liquid siliconic polymer consisting of tetramethyl-tetrapropyl-3-oxy-[4-(2,2,6,6,-tetramethyl)piperidinyl]cyclotetrasiloxane (UVASIL 299 LM of Great Lakes) and 38 g of polypropylene in powder form of the type Moplen FLF20 of Himont having a MFI of 12 g/10' (ASTM D1238L) and a density of 0.9 g/cc are charged into a flask equipped with stirrer.

The mixture is brought to a temperature of 220° C. and is maintained for about 30 minutes at this temperature thus allowing the polypropylene to melt and form a single liquid phase with the siliconic polymer.

The mixture is subsequently discharged from the reactor, poured into an aluminum tank and left to cool to room temperature. The cooling time is 20 minutes.

The solid product thus obtained, waxy and friable in appearance, is ground and sieved with suitable sieves to obtain a powder with a particle size ranging from 0.1 mm to 0.5 mm in diameter.

200 g of the above powder are charged onto a glass extraction column equipped with a porous septum and heating jacket inside which water heated to a temperature of 50° C. circulates.

600 cc of toluene are passed from the top of the column through the powder over a period of about 2 hours, obtaining the complete extraction of the siliconic product from the polypropylene.

The polypropylene powder remaining in the column can be dried by stripping the toluene under vacuum at a temperature of 70° C. and at a pressure gradually reduced from 150 mm/Hg to 5 mm/Hg.

After drying, 30 g of polypropylene powder are recovered, equal to 98.7% of the polymer charged.

Upon microscopic observation at 2500×, the polypropylene has a spongy surface having intercommunicating pores with dimensions ranging from 3 µm to 5 µm.

The porous polypropylene thus obtained, which proves to be highly crystalline, has the following characteristics:

melting point: 172° C.–173° C. (determined by DSC analysis):

melting ΔH: 115 joule/g (determined by DSC analysis);

MFI: 20 g/10';

density of the bulk: 0.14 g/cc;

density of the powder having a diameter of 0.1–0.5 mm: 0.11 g/cc;

quantity of voids: 85%±2%.

EXAMPLE 3

80 g of α-tocopherol are dissolved at room temperature and under stirring in 250 ml of ethyl alcohol. 20 g of porous polypropylene obtained as described in Example 2 are then added to the solution thus obtained.

The mixture is maintained under stirring, at room temperature, for 60 minutes. The ethyl alcohol is subsequently removed by distillation under vacuum, operating at a temperature of 70° C. and at a pressure gradually reduced to 5 mm/Hg.

99.8 g of a yellowish-white solid free-flowing product are obtained, containing 80% by weight of α-tocopherol.

EXAMPLE 4

65 g of α-tocopherol are dissolved at room temperature and under stirring in 400 ml of ethyl alcohol. 35 g of porous polypropylene obtained as described in Example 1 are then added to the solution thus obtained.

The mixture is maintained under stirring, at room temperature, for 60 minutes. The ethyl alcohol is subsequently removed by distillation under vacuum, operating at a temperature of 70° C. and at a pressure gradually reduced to 5 mm/Hg.

100.3 g of a yellowish-white solid free-flowing product are obtained, containing 65% by weight of α-tocopherol.

EXAMPLE 5

200 ml of ethyl alcohol are added, at room temperature and under stirring, to a liquid formulation containing 15 g of α-tocopherol, 15 g of glycerine, 32 g of glycerol monocaprylate-caprate and 13 g of polyethyleneglycol (described in European patent application EP 542.108). 18.5 g of porous polypropylene obtained as described in Example 2 are then added to the solution thus obtained.

The mixture is maintained under stirring, at room temperature, for 60 minutes. The ethyl alcohol is subsequently removed by distillation under vacuum, operating at a temperature of 70° C. and at a pressure gradually reduced to 5 mm/Hg.

100 g of a yellowish-white solid free-flowing product are obtained, containing 80% by weight of the formulation of α-tocopherol described above.

EXAMPLE 6

40 g of α-tocopherol and 40 g of tris(2,4-di-t-butyl-phenyl)phosphite, known under the trade-name of Alkanox 240 of Great Lakes, are dissolved at room temperature and under stirring in 200 ml of ethyl alcohol. 20 g of porous polypropylene obtained as described in Example 2 are then added to the solution thus obtained.

The mixture is maintained under stirring, at room temperature, for 60 minutes. The ethyl alcohol is subsequently removed by distillation under vacuum, operating at a temperature of 70° C. and at a pressure gradually reduced to 5 mm/Hg.

100.2 g of a yellowish-white solid free-flowing product are obtained, containing 80% by weight of the mixture (40% by weight of α-tocopherol and 40% by weight of tris(2,4-di-t-butyl-phenyl)phosphite described above.

EXAMPLE 7

40 g of α-tocopherol and 40 g of tetrakis methylene(3,5-di-t-4-hydroxyhydrocinnamate)methane, known under the trade-name of Anox 20 of Great Lakes, are dissolved at room temperature and under stirring in 200 ml of ethyl alcohol. 20 g of porous polypropylene obtained as described in Example 2 are then added to the solution thus obtained.

The mixture is maintained under stirring, at room temperature, for 60 minutes. The ethyl alcohol is subsequently removed by distillation under vacuum, operating at a temperature of 70° C. and at a pressure gradually reduced to 5 mm/Hg.

100 g of a yellowish-white solid product are obtained, containing 80% by weight of the mixture (40% by weight of α-tocopherol and 40% by weight of tetrakis methylene(3, 5-di-t-4-hydroxyhydrocinnamate)methane described above.

EXAMPLE 8

40 g of α-tocopherol and 40 g of poly-methyl-3-oxy-[4-(2,2,6,6-tetramethyl)piperidinyl]siloxane, known under the trade-name of Uvasil 299 of Great Lakes, are dissolved at room temperature and under stirring in 200 ml of ethyl alcohol. 20 g of porous polypropylene obtained as described in Example 2 are then added to the solution thus obtained.

The mixture is maintained under stirring, at room temperature, for 60 minutes. The ethyl alcohol is subsequently removed by distillation under vacuum, operating at a temperature of 70° C. and at a pressure gradually reduced to 5 mm/Hg.

100.3 g of a yellowish-white solid product are obtained, containing 80% by weight of the mixture (40% by weight of α-tocopherol and 40% by weight of polymethyl-3-oxy-[4-(2,2,6,6-tetramethyl)piperidinyl]siloxane described above.

What is claimed is:

1. A process for the preparation of a solid form of a stabilizer, which comprises the following steps:
   (i) dissolving at least one tocopherol, in an inert organic solvent at a temperature of from 20° C. to 50° C.;
   (ii) admixing a porous polypropylene with a crystallinity of 65–75% stirring said mixture for 60 minutes, at a temperature of from 20° C. to 50° C.;

(iii) removing the solvent from the mixture at a temperature ranging from 50° C. to 100° C. and at a reduced pressure;

to produce a solid form of a stabilizer, comprising a stabilizer mixture absorbed on said porous polypropylene, in a quantity ranging from 30% to 85% by weight, based on the weight of said solid form of said stabilizer.

2. The solid form of a stabilizer for organic polymers according to claim 1, wherein the stabilizer is absorbed on said porous polypropylene in a quantity ranging from 50% to 85% by weight.

3. The process according to claim 1, wherein said stabilizer mixture is absorbed on said porous polypropylene in a quantity ranging from 50% to 85% by weight.

4. The process according to claim 1, wherein said tocopherol is selected from the group consisting of D,L-$\alpha$-tocopherol, methyl derivatives of (2-methyl-2-(4',8',12'-trimethyltridecyl)-6-chromanol)tocol, D-$\alpha$-tocopherol (5,7,8,-trimethyltocol), D-$\beta$-tocopherol (5,8-dimethyltocol), D-$\gamma$-tocopherol (7,8-dimethyltocol), and D-$\delta$-tocopherol (8-methyltocol), and mixtures thereof.

5. The process according to claim 1, wherein said tocopherol is selected from the group consisting of D-$\alpha$-tocopherol acetate, D,L-$\alpha$-tocopherol acetate, D-$\alpha$-tocopherol succinate acid, D-$\alpha$-tocopherol polyethyleneglycol 1000 succinate, and D-$\alpha$-tocopherol quinone, and mixtures thereof.

6. The process according to claim 1, wherein said tocopherol is selected from the group consisting of methyl derivatives of (2-methyl-2-(4',8',12'-trimethyltrideca- 3',7',11'-trienyl)-6-chromanol) tocotrienol containing three unsaturated bonds in the lateral chain, and mixtures thereof.

7. The process according to claim 1, wherein said tocopherol is selected from the group consisting of $\alpha$-tocopherol, and $\gamma$-tocopherol, and mixtures thereof.

8. The process according to claim 1, wherein said tocopherol is dissolved in a formulation, comprising:

(A) from 10% to 50% by weight of said tocopherol;

(B) up to 50% by weight of polyethyleneglycol; and/or (C) up to 50% by weight of glycerol monocaprylactocaprate;

and, optionally, (D) up to 20% by weight of glycerine, wherein a total of said (A)–(D), if present, is 100%.

9. The process according to claim 1, wherein said porous polypropylene is obtained by a process comprising:

(1) mixing a polypropylene with at least one silicon compound carrying a sterically hindered amine group in the molecule, to form a mixture;

(2) melting said mixture at a temperature and for a time sufficient, to form a liquid phase mixture;

(3) cooling the liquid phase mixture until a solid is formed;

(4) extracting the silicon compound from the solid with a solvent.

10. The process according to claim 1, wherein the stabilizer mixture comprises:

(a') from 30% to 85% by weight of said tocopherol;

(b') from 0% to 50% by weight of a secondary antioxidant containing phosphorus or sulfur;

(c') from 0% to 50% by weight of a sterically hindered phenol;

(d') from 0% to 50% by weight of a sterically hindered amine.

11. The process according to claim 9, wherein the stabilizer mixture is absorbed on said porous polypropylene in a quantity ranging from 50% to 85% by weight.

12. The process according to claim 1, wherein said organic solvent is selected from the group consisting of an aromatic solvent, an aliphatic solvent, and an alcohol, and mixtures thereof.

13. The process according to claim 1, further comprising mixing or blending said solid form of said stabilizer with an organic polymer selected from the group consisting of a polyvinyl chloride, a polyolefin, a styrene polymer, a styrene copolymer and a polyurethane, and mixtures thereof.

14. The solid form of the stabilizer prepared by the process according to claim 1.

15. The process according to claim 1, wherein said tocopherol is dissolved in presence of a stabilizer selected from the group consisting of secondary antioxidants containing phosphorus, secondary antioxidants containing sulfur, sterically hindered phenols, and sterically hindered amines, and mixtures thereof.

* * * * *

UNITED STATES PATENT AND TRADEMARK OFFICE
CERTIFICATE OF CORRECTION

PATENT NO. : 6,056,897
DATED : May 2, 2000
INVENTOR(S): Luciano PALLINI, et al.

It is certified that an error appears in the above-identified patent and that said Letters Patent is hereby corrected as shown below:

On the Title Page, Item [73], the Assignee's city is misspelled. Item [73] should read as follows:

--- [73] Assignee: Great Lakes Chemical (Europe) GmbH, Frauenfeld, Switzerland ---

On the Title Page, the Attorney, Agent, or Firm information is incorrect. It should read as follows:

--- Attorney, Agent, or Firm -- Oblon, Spivak, McClelland, Maier & Neustadt, P.C. ---

Signed and Sealed this

Tenth Day of April, 2001

*Attest:*

NICHOLAS P. GODICI

*Attesting Officer*   *Acting Director of the United States Patent and Trademark Office*